UNITED STATES PATENT OFFICE.

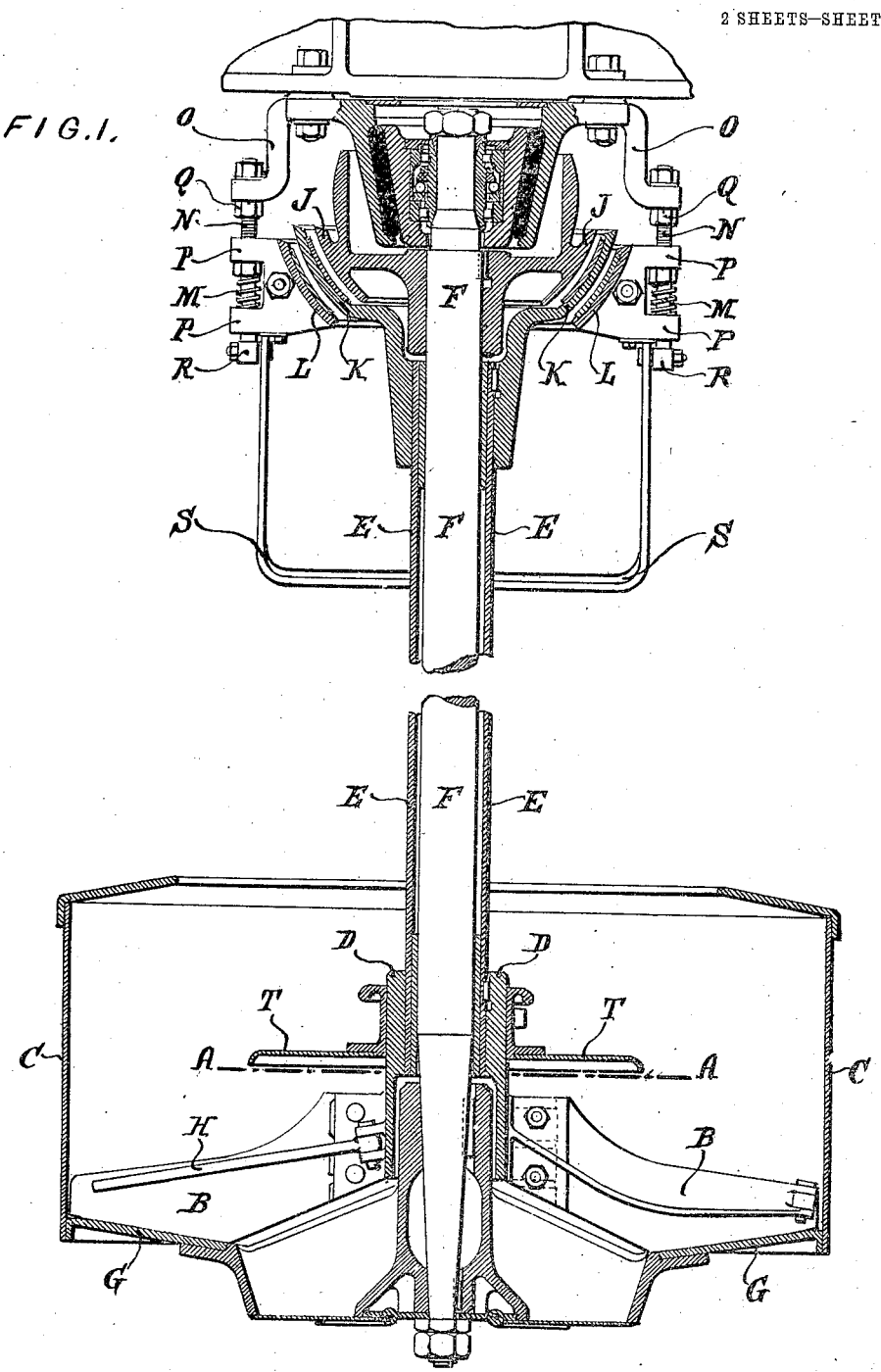

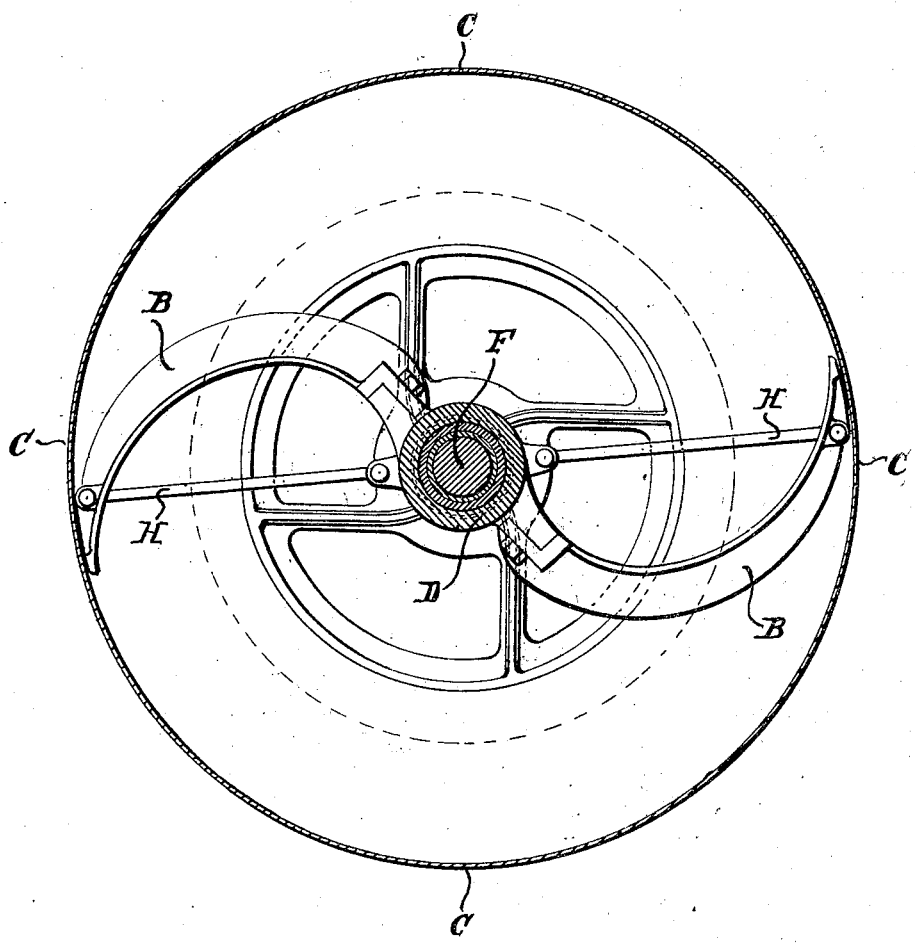

ANDREW ROBERT ROBERTSON, OF KINGSTON, GLASGOW, SCOTLAND.

CENTRIFUGAL MACHINE.

1,124,807.  Specification of Letters Patent.  Patented Jan. 12, 1915.

Application filed May 8, 1914. Serial No. 837,306.

*To all whom it may concern:*

Be it known that I, ANDREW ROBERT ROBERTSON, a subject of the King of Great Britain and Ireland, and a resident of Kingston, in the city and county of Glasgow, Scotland, have invented certain new and useful Improvements in Centrifugal Machines, of which the following is the specification.

This invention relates to centrifugal machines principally intended for use in drying sugar or other granular materials, and of the type in which the discharge of the dried contents of the basket is assisted by a mechanical plow or scoop device; and has for its object to provide an improved construction of such device, and improved means for operating same, such that after the material is dried the scoop is brought into action to insure the removal of the lowermost portion of the material through the usual central discharge opening in the basket. On the removal of this portion, gravity causes the then unsupported remainder of the material to be freed from the sides of the basket, and the scoop then also further acts to insure the complete discharge of the material.

According to the invention, the improved scoop device consists of a paddle or series thereof extending out to near the inner circumference of the basket from a central hub part on the lower end of a sleeve free to rotate on the basket spindle. The under sides of the paddles are so contoured that they rest on the bottom of the basket, so that this frictional contact causes the paddles to rotate with the basket when the latter is in motion. Braking means are provided, so that when the basket is to be discharged, the rotation of the sleeve and paddles is arrested before the basket comes to rest. Owing to the relatively slower movement of the paddles thus produced, they cut away and discharge the lower portion of the dried material, and the basket is finally emptied as hereinbefore described. If desired, the braking means may be made to also act in such a manner as to assist in stopping the rotation of the basket, and if the basket is brought to rest before the material is finally discharged, the braking means may be so far withdrawn that while the sleeve and paddles continue to be held, power may be again applied to the basket spindle and the basket again rotated, thus enabling the paddles to complete the discharge of the contents as hereinbefore described.

The paddles may be of any convenient form, but preferably they are so curved that those faces which move against the contents of the basket are concave, and stay rods extend between the hub and the outer ends of the paddles to prevent them tending to straighten themselves under the pressure of centrifugal action. The hub also carries a distributing plate on to which the material is fed and from which it is thrown against the basket by centrifugal force.

The improved construction of scoop and means of operating the same may with advantage be used in a basket the shell of which is conical as described in the specification filed with my concurrent application for a patent, since it is obvious that if the lower part of the sugar wall is removed by the scoop, the conical shell of the basket will assist gravity in causing the wall of sugar to fall down.

An example of the improved construction of scoop device is shown in Fig. 1 in vertical section, and in Fig. 2, taken on the line A—A Fig. 1, in sectional plan, on an accompanying sheet of explanatory drawings.

As shown in the drawings, the improved scoop device consists of paddles B extending out to near the inner circumference of the basket C from a central hub D on the lower end of a sleeve E free to rotate on the basket spindle F. The under sides of the paddles are so contoured that they rest on the bottom G of the basket C, so that this frictional contact causes the paddles to rotate with the basket when the latter is in motion. The paddles are so curved that those faces which move against the contents of the basket are concave, and stay rods H extend between the hub D and the outer ends of the paddles B to prevent them tending to straighten themselves under the pressure of centrifugal action.

The braking device consists of two spherically surfaced brake drums, one J being carried by the basket spindle F, and the other K exterior thereto and carried on the paddle supporting sleeve E. A similarly surfaced brake ring L extends around the outer brake drum K, and is normally held out of action with it by springs M surrounding bolts N secured at their upper ends to depending arms O, these bolts passing through lugs P formed on the brake ring L, the springs acting between adjusting nuts Q on the bolts and the lower lugs. Cam levers R are provided for operating the brake ring L. These levers R are pivoted on the lower ends of the bolts N and are connected together by a stirrup handle S. Thus, when the levers R are moved, the brake ring L can be made to bear first on the brake drum K, thereby slowing down and finally stopping the rotation of the paddles B. A further movement of the levers R causes the drum K to bear on the inner brake drum J, thereby slowing down and finally stopping the rotation of the basket C, all as hereinbefore described. The hub D carries a distributing plate T on to which the material is fed and from which it is thrown against the basket C by centrifugal force.

What I claim is:—

1. In a centrifugal machine, a scoop device within and rotating with the basket, and means for retarding the scoop device so that it moves relatively to the basket to discharge the contents thereof.

2. In a centrifugal machine, a scoop device comprising a sleeve surrounding the usual basket spindle, a hub on the lower end of the sleeve, paddles carried by the hub, the under side of the paddles being so contoured that they rest on the bottom of the basket, and means for controlling the rotation of the scoop device relatively to that of the basket.

3. In a centrifugal machine, a sleeve surrounding the usual basket spindle, a hub thereon, paddles so carried by the hub that they rest on the bottom of the basket, the paddles being so curved that those faces which move against the contents of the basket are concave, stay rods extending between the hub and the outer ends of the paddles, and means for controlling the rotation of the paddles relatively to that of the basket.

4. In a centrifugal machine, a sleeve surrounding the usual basket spindle, a hub thereon, paddles so carried by the hub that they rest on the bottom of the basket, two brake drums, one on the basket shaft and the other exterior thereto and carried on the sleeve, a spring controlled brake ring exterior to the outer brake drum, and means for operating the brake ring as described.

5. In a centrifugal machine, a sleeve surrounding the usual basket spindle, a hub thereon, paddles so carried by the hub that they rest on the bottom of the basket, two brake drums, one on the basket shaft and the other exterior thereto and carried on the sleeve, a brake ring exterior to the outer brake drum, bolts carrying the brake ring, springs on the bolts normally holding the brake ring out of contact with the outer brake drum, and cam levers fulcrumed on the bolts to operate the brake ring against the action of the springs.

In testimony whereof I have signed my name to this specification, in the presence of two subscribing witnesses.

ANDREW ROBERT ROBERTSON.

Witnesses:
 WILFRED HUNT,
 JAMES EAGLESOM.